March 13, 1956 B. A. BRAUN 2,737,951
CLINICAL CANNULA OR TUBULE DEVICE
Filed Dec. 11, 1952
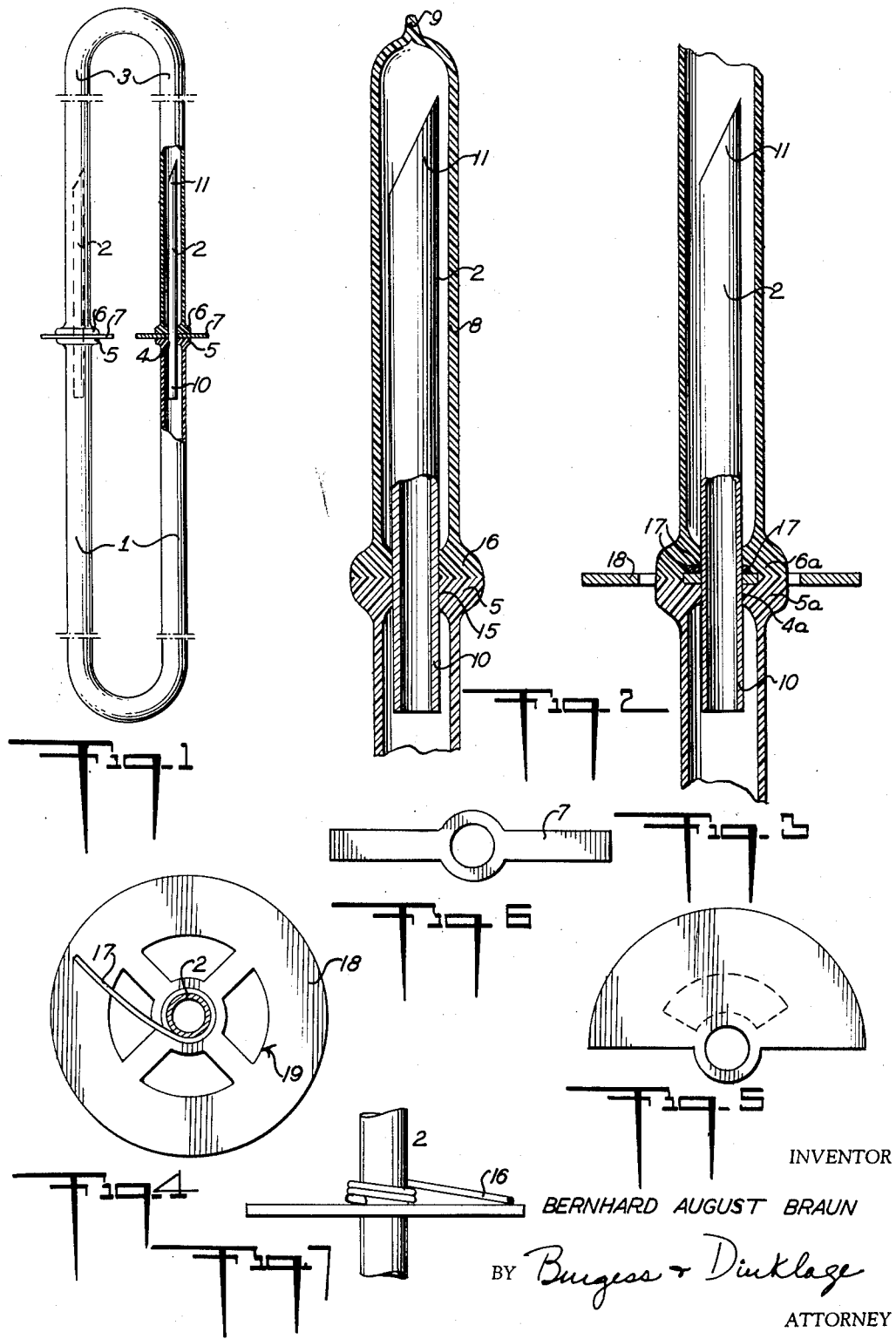
INVENTOR
BERNHARD AUGUST BRAUN
BY Burgess + Dinklage
ATTORNEY

United States Patent Office 2,737,951
Patented Mar. 13, 1956

2,737,951

CLINICAL CANNULA OR TUBULE DEVICE

Bernhard August Braun, Melsungen Traenkeluecke, Germany, assignor to Bronwill Scientific, Inc., a corporation of New York Application December 11, 1952, Serial No. 325,267

15 Claims. (Cl. 128—221)

This invention relates to new and useful improvements in clinical cannula or tubule device.

One object of the invention comprises, among others, an improved clinical cannula device for the transfusion, infusion or removal of blood or the infusion or injection into the circulatory system of suitable solutions and particularly those of the type of plasma or other blood extenders, saline or similar solutions, glucose or other nutritive solutions and the like.

The foregoing and further objects of the invention will be apparent from the following description read in conjunction with the drawings in which:

Fig. 1 illustrates a side view, partly in cross-section, of a preferred embodiment in accordance with the invention;

Fig. 2 shows a side view, partly in cross-section, of a portion of an alternative embodiment of the invention;

Fig. 3 is a fragmentary side view, partly in cross-section, showing a portion of an embodiment in accordance with the invention illustrating a guide member or support for the cannula;

Fig. 4 is a top view of part of the embodiment shown in Fig. 3 with the tubes and sealing matter removed;

Figs. 5 and 6 illustrate top views of alternative embodiments of guide or support members; and Fig. 7 is a side view of part of an alternative embodiment illustrating tube cutting or stripping means.

Referring to the drawings the novel clinical cannula device in accordance with the invention comprises a substantial hermetically sealed conduit composed, for example, of the conduit portions 1 and 3 and two injection cannulae 2 located within the conduit. The latter have the injection tips 11 and the non-injection ends 10. In each case, the exterior of the non-injection end 10 is sealed to the interior of the tubular member 1 in substantially liquid-tight relation thereto. The tube 3 is passed with its ends over the tips 11 of the cannulae 2 and is secured in hermetically sealed relation to the latter. Both tubes 1 and 3 are preferably of a heat sealable thermoplastic material such as, for instance, polyethylene and the sealing of tube 1 to the end 10 of cannulae 2 is then preferably secured by way of heat sealing thereby essentially shrinking the tube onto the cannulae, as indicated at 4 in Fig. 1 or 4a in Fig. 3. Similarly, the tube 3 may be heat sealed to the end 10 of the cannulae 2 and preferably with the formation, while heating, of a thickened ring member 6 (Fig. 1). Similarly, also a thickened ring member 5 may be obtained as part of the heating and heat sealing operation of the heat sealable thermoplastic tube 1.

Within the preferred embodiment of the invention a guide or support member is provided for at least one cannula. In a two-cannulae instrument, preferably both cannulae are provided with such a guide or support. The latter may comprise a simple disk member 7 (Fig. 1) secured to or carried by cannula 2 at its non-injection end 10. It is important that this guide or support member is secured to retain a relatively fixed position with respect to the cannula when injecting the same into an infusion container or into a patient, as the case may be. Thus, when injecting the cannula by bringing pressure to bear upon the guide or support member, the latter should not slip forward on the cannula. Alternatively, the resistance encountered by the cannula, when injecting the same, should not cause the cannula to slip backwardly. A guide or support properly secured relative to the cannula will act as a stop against the hand or fingers of the operator, thus avoiding back slippage of the cannula. When using a substantially solid disk member, it is essential that a good hermetic seal is obtained at both its sides inasmuch as it is interposed between the two conduit portions, as illustrated by the conduits 1 and 3 in Fig. 1. In order to assure a particularly good hermetic seal and especially one obtained by fusion of a thermoplastic material used for the conduits, it is preferred to utilize a guide or support member of the disk type shown in Figs. 3 and 4 and provided with cutout portions which will permit a fusion joint between the conduit portions and thus provide an excellent hermetic seal for the all over conduit. For the same reason, other suitable shapes may be used as guide or support members being of a type that will permit a fusion joint of the conduit portions and as, for example, illustrated in Figs. 5 and 6.

It is of advantage in all cases, however, to select as a guide or support member one which will not appreciably extend beyond the cannular passage tube on at least one side thereof. This is, for instance, illustrated by the semi-disk of Fig. 5 in which an optional aperture is shown in dotted outline. Such an aperture would be helpful to facilitate the fusion joint between the conduit portions.

The alternative guide or support member shown in Fig. 6 is essentially a flat relatively narrow strip which may be secured on the cannular body. Its rim is sufficiently narrow to permit flowing of sealing material or fused heat sealing material of the conduit portions for a substantially hermetically sealed joint.

The guide or support members may be of any suitable material, such as metal, plastic or the like. Their securing to the cannula may be obtained by either a press fit, if constituted of metal, or by soldering the same onto the cannula. Alternatively, the guide or support may be secured against back slippage of the cannula by soldering or otherwise providing thereon a projection or abutment. This may be, for instance, in the form a small wire which, as illustrated in Fig. 7, may be secured at least partly around the cannula, such as by soldering or the like, and may then continue to be wound loosely at least one full turn to its last point of attachment to the cannula and thence outwardly. In this manner, the seal or fusion joint between heat sealable material conduit portions may be broken by pulling back the free end of the wire 16 (Fig. 7) which acts to sever the conduit portion covering the cannula tip section.

The guide or support may then be carried on the cannula either relatively loosely or as a press fit. In any event, the wire or other projection on the cannula will prevent back slippage of the latter. A relatively loosely fitting guide or support will be further held in position by its sealing abutment with the conduit.

An alternative built-in cutting arrangement is illustrated in Figs. 3 and 4, a wire 17 being secured to cannula 2, such as by soldering at one point or section thereof and being then wound at least once around the cannula and then tangentially outwardly preferably resting with its tip on disk 18. If necessary, the wire may be raised into gripping position by pushing against the same through one of the apertures 19 of the disk 18.

It is important, in accordance with the invention, that the entire conduit containing the cannula or cannulae and defined by the conduits illustrated, for instance, as 1 and 3 in Fig. 1 is, as such, completely hermetically sealed, so that the entire instrument can be sterilized and remain sterile until the same is ready for use. The conduit may be either defined by the two tubular members, such as 1 and 3 abutting or substantially abutting one another, or alternatively having at least a portion of a cannula form a part of the conduit. In each case, however, there is an all over hermetically sealed conduit. The cannula ends projecting into conduit portion 1, which is to act as a liquid passageway, should be in substantially liquid-tight seal relation thereto and conduit 1 is preferably sealed, such as heat sealed, relative to the cannulae ends.

If the guide or support members are in substantially disk form, it may suffice to have the hermetic conduit seal effected between the tube ends and the disk. It is, however, in that case preferred to have additionally hermetical sealing also between the inner tube walls and the outer surface of the cannula tube. As hereinabove illustrated and described, however, it is desirable to provide either by the form of the guide or support or by suitable apertures therein, for a fusion joint between the conduit portions. With specific reference to the semi-disk or the strip, or similar shapes as illustrated in Figs. 5 and 6, it will be readily seen that this form of guide support additionally permits a relatively flat angle of injection into a patient's vein by so securing the guide or support onto the cannula in relation to the cannula tip that the relatively straight edge nearest the cannula and, in case of a semi-disk or similar shape, its flat portion will face the arm of the patient.

In the practical use of the device in accordance with the invention, as illustrated for instance in Fig. 1, the portion of tube 3 surrounding the cannula or being adjacent the cannula tip is severed or cut for access to the injection tip of the cannula. This may be accomplished in various ways. The material of tube 3 being preferably of readily knife-cuttable material, the tube may be cut with, for instance, a sterilized pair of scissors. If the cutting is carried out at or near the base of cannula 2, the portion of tube 3 surrounding the upper part of cannula 2 may be slipped off thereby exposing the cannula tip 11 ready for use. Alternatively, as above described, a cutting or stripping member may be provided such as the wire or similar means illustrated in Figs. 3, 4 and 7 to permit the ready severance of the fusion joint.

In lieu of a single conduit portion 3, the ends of which are slipped over the cannulae 2, it is also possible to use individual tube ends on part of the all-over hermetically sealed conduit, as for instance illustrated for one such tube end in Fig. 2. As there shown, the tube end 8 surrounds cannula 2 and is hermetically sealed to the latter at 15. Tube 8 is hermetically sealed at its end 9. All of this hermetical sealing is preferably accomplished in the case of a heat sealable thermoplastic material by heat fusing the ends and pressing the same together.

Within the broadest aspects of the invention, the clinical cannula device may be one containing only a single injection cannula. Such a device is similar to that illustrated in Figs. 1-3 providing, however, in that event only a single cannula extending within the hermetically sealed conduit. In that case, when using a substantially single conduit portion such as 3 in Fig. 1, the end which is severed or cut in order to expose the cannula injection tip for use will serve as an open end of the device. Any sterile instrument or other liquid-feed tip may then be passed into this end for the insertion of the appropriate liquid into the device. In the case of an embodiment having an individual conduit portion (as in Fig. 2) for a single cannula tip device, the hermetically sealed free end thereof may be severed or cut and will then constitute such open end for device-tip insertion.

The double cannula device, in accordance with the preferred embodiment of the invention, however, is one of much more universal applicability and greater utility than the single cannula device. It can be used not only for direct transfusions from one person to another, but it is also readily usable for infusion purposes in which one of the cannulae is inserted into, for instance, a vein or other appropriate body portion of a person, while the other cannula is pushed through the sterile rubber or similar top of a container from which a desired liquid is to be fed for infusion.

Though polyethylene has been given as a preferred heat sealable thermoplastic material for the tubes or other conduit members of the device, in accordance with the invention, other similar heat sealable thermoplastic materials may be used. It is, of course, understood that the material to be selected should be one substantially non-reactive with and otherwise inert to the action of a particular liquid intended to flow through the liquid passageway portion (such as 1 in Fig. 1) of the device. In a double cannula device, however, it would then not be necessary to have the material covering the cannulae to be of this non-reactive or substantially inert type. For convenience of manufacture, however, I prefer the entire conduit material to be substantially the same. Instead of heat sealing the tubular members onto the cannulae by fusion, it is also possible to use a separate sealing material, such as a sealing cement, to obtain the hermetical seal or seals of the conduit.

Though transparency or translucency of the passage portion of the cannulae device in accordance with the invention, is not a prerequisite for its successful operation, I find it of advantage and desirable in many cases to have the passage tube of substantially transparent or translucent material. This will permit observance and checking of continuity of liquid flow particularly in connection with the darker colored liquids such as blood.

An important advantage of the construction in accordance with the invention is the relative ease and inexpensiveness of manufacture of a sterile disposable transfusion or infusion device, i. e. one completely sterile for first use and not intended for reuse. In this manner, the convenience of the user is served, eliminating the necessity for sterilization of either the new or of used equipment of this type. This is particularly advantageous because equipment of the transfusion or infusion type, once used, does not always readily lend itself to sufficient cleaning and/or sterilization by reason of pockets and other dead spaces therein. Thus, pyragenous materials or viri may remain giving rise respectively to fever or hepatitis in the infusion recipients.

I claim:

1. Clinical cannula device comprising substantially hermetically sealed conduit means having a substantially integral outer surface, defining a substantially flexible liquid passage portion, and, in at least one passage end thereof, an injection cannula completely extending within said conduit and secured with the exterior of its non-injection end in substantially liquid tight seal relative to said passage end, at least a portion of said conduit means ahead of said cannula end being cuttable for exposing the injection tip of said cannula.

2. Device according to claim 1 in which there is additionally provided hand-support means substantially secured relative to the cannula against back-slippage thereof.

3. Device according to claim 2 in which there is additionally provided means secured relative to the cannula and conduit means ahead of said cannula end for severing the conduit to thereby expose the injection tip.

4. Clinical cannula device comprising substantially hermetically sealed conduit means having a substantially integral outer surface and two injection cannulae within said conduit means facing one another with their non-injection ends and with the exterior of the latter in substantially liquid tight seal relative to the rearwardly extending portions of said conduit means, at least a portion of said conduit means ahead of each of said cannula ends being cuttable for exposing the injection tips of said cannulae and at least said rearwardly extending portions being of substantially flexible material.

5. Device according to claim 4 in which there is additionally provided, for at least one of said cannulae, hand-support means substantially secured relative to the cannula against back-slippage thereof.

6. Device according to claim 5 in which there is additionally provided for at least one of said cannulae, means secured relative to the cannulae and conduit means ahead of said cannula end for severing the conduit to thereby expose the injection tip.

7. Clinical cannula device comprising a substantially flexible tubular liquid passage member, an injection cannula secured in each end thereof in substantially liquid tight relation relative to the walls of said tubular member, hermetically closed tubular means of knife cuttable material for each of said cannulae covering the same and secured in hermetically sealed relation to said tubular member, and, for at least one of said cannulae, hand-support means substantially secured relative to the cannula against back-slippage thereof, said tubular member, tubular means and cannulae defining a hermetically sealed conduit with said hand-support means in hermetically sealed relation thereto.

8. Device according to claim 7 in which said last mentioned tubular means constitute a tubular member passing with its end portions over said cannulae.

9. Device according to claim 8 in which there is additionally provided means secured relative to the cannula and conduit means ahead of said cannula end for severing the conduit to thereby expose the injection tip.

10. Device according to claim 7 in which said last mentioned tubular means constitute individual tubular members hermetically sealed at their cannula tip ends.

11. Device according to claim 10, in which there is additionally provided means secured relative to the cannula and conduit means ahead of said cannula end for severing the conduit to thereby expose the injection tip.

12. Clinical cannula device comprising a first flexible tube of heat sealable thermoplastic material, an injection cannula in each end thereof, each cannula carrying a guide support secured thereto against back-slippage of the cannula, each cannula being with its non-injection end substantially hermetically heat sealed relative to said first tube, a second tube of heat sealable thermoplastic material passing with its end portions over the said cannulae and being substantially hermetically heat sealed relative to said non-injection ends, said hand-support being in substantially heat sealing abutting relation to said first and second tubes, said tubes and said cannulae defining a hermetically sealed conduit with said hand supports in hermetically sealed relation thereto.

13. Device according to claim 12 in which said tubes are of polyethylene.

14. Device according to claim 12 in which each cannula non-injection end carries secured thereto a stripping wire wound at least once around the cannula and extending with its free end outside of the sealed conduit.

15. Device according to claim 14 in which said tubes are of polyethylene.

References Cited in the file of this patent
UNITED STATES PATENTS 2,638,897    Poitras _____ May 19, 1953

FOREIGN PATENTS 761,528    France _____ Jan. 5, 1934